United States Patent
Arivazhagan et al.

(10) Patent No.: US 11,562,152 B2
(45) Date of Patent: Jan. 24, 2023

(54) RE-TRANSLATION FOR SIMULTANEOUS, SPOKEN-LANGUAGE MACHINE TRANSLATION

(71) Applicant: Google LLC, Mountain View, CA (US)

(72) Inventors: Naveen Arivazhagan, Palo Alto, CA (US); Colin Andrew Cherry, Pointe-Claire (CA); Wolfgang Macherey, Sunnyvale, CA (US); Te I, Milpitas, CA (US); George Foster, Ottawa (CA); Pallavi N Baljekar, Montreal (CA)

(73) Assignee: Google LLC, Mountain View, CA (US)

( * ) Notice: Subject to any disclaimer, the term of this patent is extended or adjusted under 35 U.S.C. 154(b) by 84 days.

(21) Appl. No.: 17/030,093

(22) Filed: Sep. 23, 2020

(65) Prior Publication Data

US 2022/0092274 A1    Mar. 24, 2022

(51) Int. Cl.
  *G06F 40/58*    (2020.01)
  *G10L 15/26*    (2006.01)
  *G06F 40/47*    (2020.01)
  *G10L 15/16*    (2006.01)
  *G10L 15/19*    (2013.01)

(52) U.S. Cl.
  CPC ............. *G06F 40/58* (2020.01); *G06F 40/47* (2020.01); *G10L 15/16* (2013.01); *G10L 15/19* (2013.01); *G10L 15/26* (2013.01)

(58) Field of Classification Search
  CPC ......... G06F 40/58; G06F 40/47; G10L 15/16; G10L 15/19; G10L 15/26
  See application file for complete search history.

(56) References Cited

U.S. PATENT DOCUMENTS

| | | | |
|---|---|---|---|
| 10,346,548 B1* | 7/2019 | Wuebker | G06F 40/58 |
| 10,963,652 B2* | 3/2021 | Hashimoto | G06F 40/154 |
| 2020/0104371 A1* | 4/2020 | Ma | G06F 40/58 |

OTHER PUBLICATIONS

Niehues, et al. (2018) Low-Latency Neural Speech Translation. Proc. Interspeech 2018, 1293-1297, doi: 10.21437/Interspeech.2018-1055 (Year: 2018).*

Matusov et al. (2006). Automatic Sentence Segmentation and Punctuation Prediction for Spoken Language Translation. Proc. IWSLT, pp. 158-165. (Year: 2006).*

(Continued)

*Primary Examiner* — Michelle M Koeth
(74) *Attorney, Agent, or Firm* — Fish & Richardson P.C.

(57) ABSTRACT

Methods, systems, and apparatus, including computer programs encoded on computer-storage media, for re-translation for simultaneous, spoken-language machine translation. In some implementations, a stream of audio data comprising speech in a first language is received. A transcription for the speech in the stream of audio data is generated using an automated speech recognizer through a series of updates. A translation of the transcription into a second language is generated using a machine translation module. The translation is generated with translation iterations that translate increasing amounts of the transcription, including re-translating previously portions of the transcription. A series of translation updates are provided to a client device based on the translation iterations.

18 Claims, 3 Drawing Sheets

(56) References Cited

OTHER PUBLICATIONS

Yao et al., "Dynamic Masking for Improved Stability in Spoken Language Translation," arXiv:2006.00249v1 [cs.CL], May 30, 2020 (Year: 2020).*
Ma et al., "STACL: Simultaneous Translation with Implicit Anticipation and Controllable Latency using Prefix-to-Prefix Framework," arXiv:1810.08398v5 [cs.CL], Jun. 24, 2019 (Year: 2019).*
Shangguan et al., "Analyzing the Quality and Stability of a Streaming End-to-End On-Device Speech Recognizer," arXiv: 2006.01416v1 [cs.CL], Jun. 2, 2020 (Year: 2020).*
Xiong et al., "DuTongChuan: Context-aware Translation Model for Simultaneous Interpreting," arXiv: 1907.12984v2 [cs.CL], Aug. 16, 2019. (Year: 2019).*
Arivazhagan et al., "Re-Translation Strategies for Long Form, Simultaneous, Spoken Language Translation," arXiv, Dec. 2019, 5 pages.
Arivazhagan et al., "Re-translation versus Streaming for Simultaneous Translation," arXiv, Jun. 2020, 8 pages.
Arivazhagan et al., "Monotonic infinite lookback attention for simultaneous machine translation," arXiv, Jun. 2019, 13 pages.
Bangalore et al., "Real-time incremental speech-to-speech translation of dialogs," Proceedings of the 2012 Conference of the North American Chapter of the Association for Computational Linguistics: Human Language Technologies, Jun. 2012, pp. 437-445.
Cettolo et al., "The IWSLT 2015 evaluation campaign," International Workshop on Spoken Language Translation, 2015, 13 pages.
Cho et al., "Can neural machine translation do simultaneous translation?," arXiv, Jun. 2016, 9 pages.
Fugen et al., "Simultaneous translation of lectures and speeches," Machine Translation, Nov. 2008, 21(4):209-252.
Grissom II et al., "Don't until the final verb wait: Reinforcement learning for simultaneous machine translation," Proceedings of the 2014 Conference on Empirical Methods in Natural Language Processing, Oct. 2014, pp. 1342-1352.
Gu et al., "Learning to translate in real-time with neural machine translation," arXiv, Oct. 2016, 10 pages.
Ma et al., "STACL: Simultaneous translation with implicit anticipation and controllable latency using prefix-to-prefix framework," arXiv, Oct. 2018, 12 pages.
Matusov et al., "Evaluating machine translation output with automatic sentence segmentation," International Workshop on Spoken Language Translation, Oct. 2005, pp. 138-144.
Niehues et al., "Dynamic transcription for low-latency speech translation," Interspeech, Sep. 2016, pp. 2513-2517.
Niehues et al., "Low-latency neural speech translation," Interspeech, Sep. 2018, pp. 1293-1297.
Niehues et al., "The IWSLT 2018 evaluation campaign," International Workshop on Spoken Language Translation, 2018, 5 pages.
Papineni et al., "Bleu: a method for automatic evaluation of machine translation," Proceedings of the 40th Annual Meeting of the Association for Computational Linguistics, Jul. 2002, pp. 311-318.
Press et al., "You May Not Need Attention," arXiv, Oct. 2018, 7 pages.
Ren et al., "SimulSpeech: End-to-End Simultaneous Speech to Text Translation," Proceedings of the 58th Annual Meeting of the Association for Computational Linguistics, Jul. 2020, pp. 3787-3796.
Shavarani et al., "Learning segmentations that balance latency versus quality in spoken language translation," Proceedings of the Eleventh International Workshop on Spoken Language Translation, 2015, 26: 8 pages.
Slator.com [online], "New Google Research May Improve Live-Translation of Virtual Meetings," Apr. 2020, retrieved on Sep. 24, 2020, retrieved from URL<https://slator.com/machine-translation/new-google-research-may-improve-live-translation-of-virtual-meetings/>, 8 pages.
Wikipedia.com [online], "Levenshtein distance," last edited on Aug. 31, 2020, retrieved on Sep. 24, 2020, retrieved from URL<https://en.wikipedia.org/wiki/Levenshtein_distance>, 8 pages.
Xiong et al., "Dutongchuan: Context-aware translation model for simultaneous interpreting," arXiv, Jul. 2019, 19 pages.

* cited by examiner

| Update No. | Text Added in ASR Update (L1) | Segment of Text Translated (L1) | Translation Result (L2) (Before masking) | Caption (L2) (After Masking) |
|---|---|---|---|---|
| ... | ... | ... | ... | ... |
| 234 | Nunca | Nunca | Never | --- |
| 235 | es | Nunca es | Never is | Never |
| 236 | tarde | Nunca es tarde | *It is* never too late | *It is* never too |
| 237 | para | Nunca es tarde para | It is never too late for | It is never too late |
| 238 | aprender | Nunca es tarde para aprender. | It is never too late *to learn*. | It is never too late to learn. |
| ... | ... | ... | ... | ... |

|   |   | R | e | q | u | i | r | e | r | a | n | u | n | t | r | a | n | s | p | l | a | n | t | e |
|---|---|---|---|---|---|---|---|---|---|---|---|---|---|---|---|---|---|---|---|---|---|---|---|---|
|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| r | 1 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| e | 2 | 2 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| q | 3 | 3 | 2 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| u | 4 | 4 | 3 | 2 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| i | 5 | 5 | 4 | 3 | 2 | 1 | 2 | 3 | 4 | 5 | 6 | 7 | 8 | 9 | 10 | 11 | 12 | 13 | 14 | 15 | 16 | 17 | 18 | 19 | 20 | 21 |
| e | 6 | 6 | 5 | 4 | 3 | 2 | 2 | 3 | 4 | 5 | 6 | 7 | 8 | 9 | 10 | 11 | 12 | 13 | 14 | 15 | 16 | 17 | 18 | 19 | 20 |
| r | 7 | 7 | 6 | 5 | 4 | 3 | 3 | 2 | 3 | 4 | 5 | 6 | 7 | 8 | 9 | 10 | 11 | 12 | 13 | 14 | 15 | 16 | 17 | 18 | 19 |
| a | 8 | 8 | 7 | 6 | 5 | 4 | 4 | 3 | 3 | 3 | 4 | 5 | 6 | 7 | 8 | 9 | 10 | 11 | 12 | 13 | 14 | 15 | 16 | 17 | 18 |
| n | 9 | 9 | 8 | 7 | 6 | 5 | 5 | 4 | 4 | 4 | 3 | 4 | 5 | 6 | 7 | 8 | 9 | 10 | 11 | 12 | 13 | 14 | 15 | 16 | 17 |

RE-TRANSLATION FOR SIMULTANEOUS, SPOKEN-LANGUAGE MACHINE TRANSLATION

BACKGROUND

Speech recognition has the goal to transcribe spoken words into the corresponding text representing the spoken words. Speech recognition has found increasing adoption as the quality of results and quality of network connections have improved significantly. Machine translation typically involves a computer system translating text from one language to another. The capabilities of machine translation systems continue to improve and find use in new applications.

SUMMARY

In some implementations, a computer system provides simultaneous machine translation of speech. Simultaneous spoken-language machine translation is the task of translating a spoken source sentence into text as it is being spoken. The system receives audio data for speech in a first language and produces translated text in a second language, without waiting for the sentence to finish. As additional speech is received, the system generates additional, corresponding translated text. In other words, the system receives speech data in a first language and concurrently generates translated text in a second language. This can be especially useful to generate captions for a live audio feed, with very low latency. For example, the system can receive a live audio stream (e.g., a lecture, sports play-by-play commentary, etc.) in one language and provide a stream of text captions in another language.

The system can use various techniques to provide translations with high accuracy, high stability, and low latency. One technique is re-translation, in which portions of speech are translated repeatedly with additional speech context as more speech is received. For example, rather than translate each word of incoming speech individually, the system can translate an increasingly larger phrase or sentence. When the first word of a sentence is received, that word is translated. When the second word of the sentence is received, the system translates the first and second word together, even though the first word was previously translated, so that the two-word phrase can be translated in a manner that accounts for the relationship between the words. This approach has several advantages. One is that by not waiting until the end of a spoken phrase or sentence to perform translation, the system can determine a translation for output very quickly (e.g., with low latency). In addition, by retranslating earlier portions of the spoken content with later-received speech, the system can provide high accuracy. For example, retranslation ensures that the initial words in a phrase are considered in the context of the later speech that completes the phrase. It allows the system to correct and replace initial translation results (e.g., for the first word or words in a sentence) if the context of later-spoken words shows that the initial translation results are not accurate in the full sentence.

While retranslation can provide high accuracy, there is a potential disadvantage of instability or "flickering" of the translated text that is output to a user. For example, translating the initial portion of a phrase may lead to a first translation for a word. However, retranslation of that initial portion with later-received portions of the phrase may lead to a different translation for the word, so that the translated word changes on a user interface. As discussed further below, the system can use techniques to improve stability, while maintaining an appropriate level of accuracy, so that the translated output rarely needs to be revised. One example is the use of a biased beam search in the machine translation, so that the system trades off some translation quality in order to bias the current translation toward stability with respect to the prior translation. This biasing can avoid changes to words that would not significantly improve the quality or understanding of the translation. Another example is the making of potentially unstable tokens in the translated output, in particular, the final token in a translation. In the retranslation process, the words at the end of the translation are typically the ones that are most likely to change. The system can mask, e.g., omit, the last k tokens from the output provided, and so delay providing the end portion of the translation that is most subject to revision. For example, the system can consistently omit the last word from a translation of a partial sentence. When translating a sentence, when the first two translated words are obtained, the system can provide only the first translated word; when the third translated word is determined, the system provides the second translated word; and so on, until the system detects the end of the sentence and the remainder of the translated sentence is provided.

The system can be configured to provide automated simultaneous spoken-language translation using an automatic speech recognition (ASR) module and a machine translation (MT) module that are independent of each other. The system can manage the input and output data streams to the ASR module and MT module so that each can operate independently, without knowledge of the other. The ability to use any available ASR module with any available MT module provides excellent flexibility, with the system combining the appropriate ASR and MT modules to allow speech-to-translated-text processing for any languages for which models are available. For example, the system can connect a Spanish ASR module and Spanish-to-English MT module, or a French ASR module and French-to-Italian MT module, or any other appropriate combination. This aspect of the system also allows the system to leverage the highest-quality ASR and MT systems available, without the need to train additional models. Additionally, the ASR and MT systems can be updated or switched out independently of each other without disruption to the system.

In a pipelined system, where the MT module receives and processes the transcription produced by the ASR module, the ASR module must also be simultaneous, in the sense of performing ASR before the end of a user's speech. The ASR module should also produce its transcription as early as possible. Most industrial implementations of simultaneous ASR have some degree of instability, meaning that the recognized transcription can change as more audio context becomes available. Just as output of translation processes may change if later context is considered, ASR output may similarly change once later-provided speech data is considered. Some forms of instability, including punctuation instability in particular, can be catastrophic to downstream MT systems that translate one sentence at a time. In many cases it is helpful to eliminate instability from ASR results altogether before providing them to the MT module for translation.

To improve stability of ultimate machine-translated output of the system, the system can use techniques to enforce the stability of ASR results, which becomes the input to the MT module. Various post-processing steps can be applied to ASR results before passing the ASR results to the MT module. One technique is to determine a stability score for an ASR output token, and suppress adding the token to the transcription unless and until the stability score reaches a predetermined threshold. Another example, includes suppressing punctuation that ends a phrase or sentence (e.g., until a speech endpoint is detected, a high confidence level is reached, etc.). The incidence of a sentence-ending punctuation mark is a very strong signal for machine translation systems configured to translate a sentence at a time. The effect of an erroneous introduction of sentence-ending punctuation in text to be translated can cause great inaccuracy for machine translation output, so suppressing it in the speech-to-text transcription helps avoid significant errors. Another example, the system can suppress the final token(s) of the ASR output text, for example, by omitting at least the last transcribed word, which is most likely to change as additional speech is received. As another example, the system can force ASR updates to the cumulative transcription to be append-only (e.g., to disallow deletion or changes of previously committed ASR results). As discussed below, the system can use an edit distance (e.g., Levenshtein distance) or other measure to align a prior transcription and a current transcription, in order to determine an appropriate segment to append even if there are differences among the initial portions of the transcriptions.

In one general aspect, a method performed by one or more computers includes: receiving, by the one or more computers, a stream of audio data comprising speech in a first language; generating, by the one or more computers, a transcription for the speech in the stream of audio data using an automated speech recognizer, the transcription being incrementally generated by the automated speech recognizer through a series of updates that add additional text in the first language to the transcription; generating, by the one or more computers, a translation of the transcription into a second language using a machine translation module, the translation being generated by performing, in response to each of the updates that add additional text in the first language to the transcription, a corresponding translation iteration that translates into the second language an end portion of the transcription, wherein the end portion for at least some of the translation iterations comprises (i) the additional text corresponding to the update and (ii) previously-translated text of the transcription, wherein, for at least some of the translation iterations, the one or more computers promote stability of the translation by biasing output toward including the previously-translated text of the transcription; and providing, by the one or more computers and over a communication network, a series of translation updates to a client device based on the translation iterations, wherein the translation updates respectively provide portions of the translated text from the corresponding translation iterations.

In some implementations, generating the transcription, generating the translation, and providing the translation updates are performed concurrently with receiving additional audio data in the stream of audio data.

In some implementations, each of the end portions includes a last full sentence of the transcription or a last partial sentence in the transcription.

In some implementations, performing the translation iterations comprises: performing a first translation iteration that translates a first word in a sentence; and performing successive translation iterations, as additional words in the sentence are received from the automated speech recognizer, that each retranslate the first word in the sentence along with subsequently received text of the sentence, such that the text translated in the successive iterations is expanded at each successive iteration until a translation iteration for the full sentence is performed.

In some implementations, providing the series of translation updates comprises omitting, from each of the translation updates that do not correspond to the translation of a full sentence, a predetermined number of tokens at the end of the sentence.

In some implementations, generating the translation comprises biasing the translation iterations toward consistency with translation results of one or more prior translation iterations.

In some implementations, biasing the translation comprises biasing a beam search process such that, for a second or subsequent translation iteration for a sentence, the biasing increases a likelihood of selection of a beam that includes the results of the immediately previous translation iteration for the sentence.

In some implementations, biasing the beam search process comprises: providing (i) a sequence of one or more source tokens to be translated, and (ii) a sequence of one or more output tokens from the previous translation iteration; and determining a score for an output token in the beam search by interpolating between (i) a posterior distribution provided by the machine translation module and (ii) a distribution representing the sequence of one or more output tokens from the previous translation iteration.

In some implementations, biasing the translation comprises biasing toward a beam that has strictly followed a target sequence representing a previous translation for sentence currently being translated; and in response to detecting that a beam diverges from the target sequence, removing the bias for the beam.

In some implementations, the machine translation module comprises a neural machine translation model.

In some implementations, the method includes applying one or more post-processing operations to the output of the automated speech recognizer to increase stability of transcription results before providing transcribed text to the machine translation module.

In some implementations, the one or more post-processing operations comprise: evaluating, for individual tokens of transcribed text, a stability score indicative of a probability that the token will change in a future update by the automated speech recognizer; and suppressing tokens for which the stability score does not satisfy a predetermined threshold from being provided to the machine translation module for translation.

In some implementations, the one or more post-processing operations comprise omitting, from the text provided to the machine translation module, punctuation that denotes the end of a sentence until a predetermined condition is determined.

In some implementations, the predetermined condition comprises detection of a speech utterance endpoint.

In some implementations, the one or more post-processing operations comprise omitting, from the text provided to the machine translation module, a predetermined number of tokens from the end of the automated speech recognizer output.

In some implementations, the one or more post-processing operations comprise limiting updates to the transcription for the text stream to appending additional words without revising existing words in the transcription.

In some implementations, the method includes, in response to determining that a transcription for a portion of audio data differs from a prior transcription for the portion audio data: identifying a shortest prefix portion of a current transcription of the sentence that can be replaced with the prior transcription to minimize an edit distance between the current transcription and the prior transcription the sentence; generating an altered version of the current transcription that replaces the identified shortest prefix portion with the prior transcription of the sentence; and providing the generated altered version of the current transcription to the machine translation module for translation into the second language.

In some implementations, the edit distance is a Levenshtein distance over characters.

Other embodiments of these and other aspects disclosed herein include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 2 is a diagram showing an example of data from a series of updates from the system.

FIG. 3 is a diagram showing an example of techniques to process speech recognition results to ensure stability of results used for translation.

Like reference numbers and designations in the various drawings indicate like elements.

DETAILED DESCRIPTION

Figure 1:
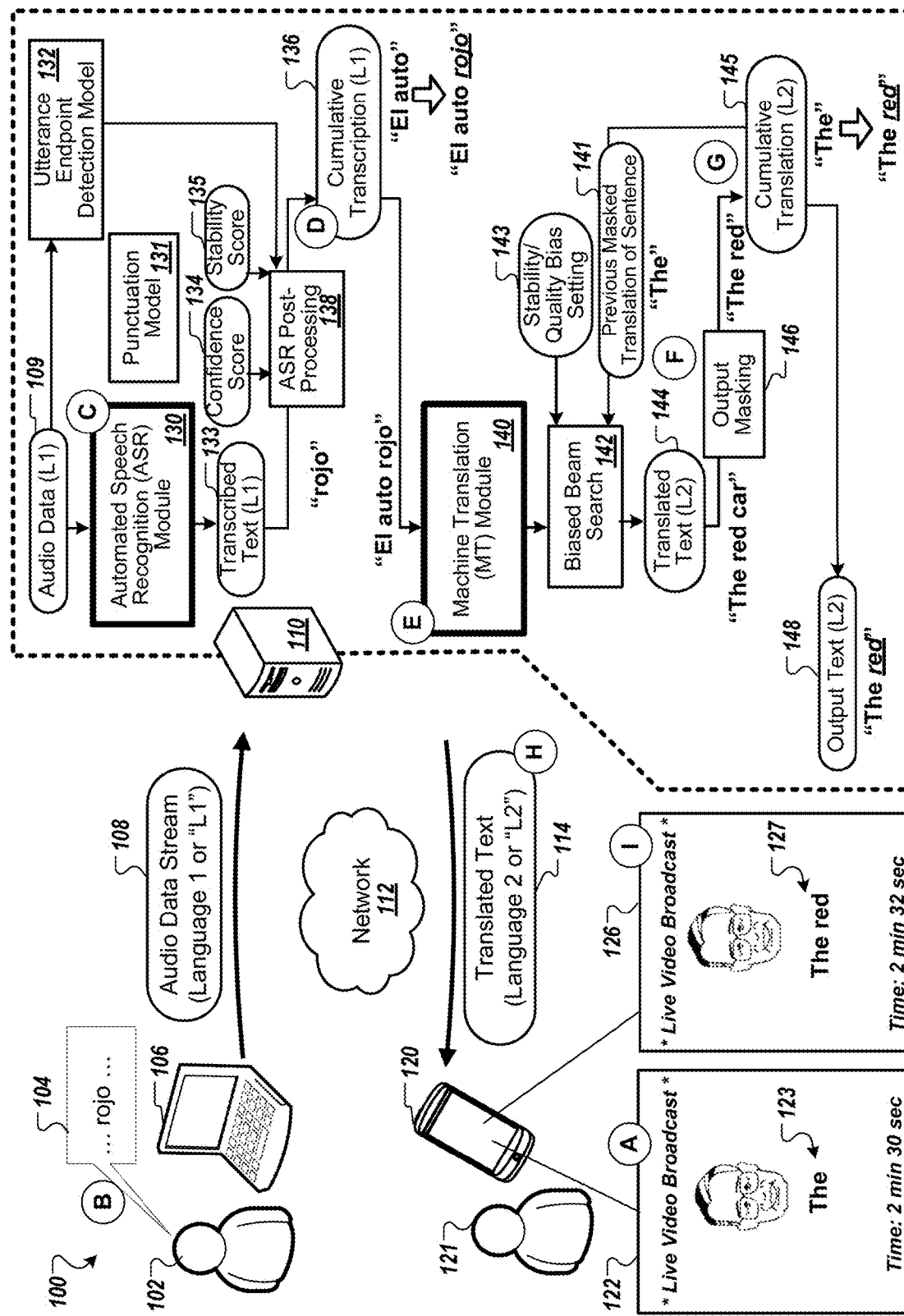
FIG. 1 is a diagram showing an example of a system for re-translation for simultaneous, spoken-language machine translation.

FIG. 1 is a diagram showing an example of a system 100 for re-translation for simultaneous, spoken-language machine translation. The system 100 includes a device 106 providing an audio data stream 108, a computer system 110 that generates translated text corresponding to the audio data stream 108, and another device 120 that receives incremental updates to the translation as a stream of translated text 114. The devices 106, 120 communicate with the computer system 112 over a communication network 112, which may include public and/or private networks, wired and/or wireless networks, and may include the Internet. The figure shows a series of stages (A) through (I) that show various computing operations and a flow of data. The stages may be performed in the order shown or in a different order.

The computer system 110 can be used for simultaneous machine translation of long-form speech content. The computer system 110 can be used in a continuous speech-to-text scenario to generate translated captions for a live audio feed, such as a lecture or sports play-by-play commentary. In this scenario, the live audio stream is translated incrementally, concurrent with the receipt of additional audio data. Translating in this manner allows for revisions to the system's incremental translations. The computer system 110 can use a re-translation approach to simultaneous translation, where the source text (e.g., of a partial phrase or sentence) is repeatedly translated from scratch as it grows. This approach exhibits very low latency, because incremental translation output can be generated without waiting for further speech to be received. The approach also provides high final quality, because the translation can be improved and corrected as additional speech is received. However, the approach has the cost of incremental instability as the output is repeatedly refined.

The computer system 110 is designed to work with industry-grade speech recognition and translation tools, augmented with inference heuristics to improve stability. The approach to simultaneous translation used by the computer system 110 can be applied to improve the stability and quality between various pairs of target languages, and can dramatically improve the incremental stability for all of them.

Recent advances in neural speech and text processing have greatly improved speech translation and even simultaneous speech translation. Many such improvements take the form of specialized models and training procedures which operate under a streaming constraint, where each update to the translation must extend the previous translation. However, when the output modality for the translation is output text (e.g., as a text caption rather than output speech), there is the option to make occasional revisions to previous predictions without being too disruptive to the user.

The ability to revise previous partial translations makes simply re-translating each successive source prefix a viable strategy. This approach has the advantage of low latency, since it always attempts a translation of the complete source prefix (e.g., the initial portion of a source sentence received so far), and high final-translation quality, since it is free to generate its final translation with knowledge of the full source sentence. The freedom to make revisions poses challenges, however. The computer system 110 ideally would control key aspects of system performance, including quality, latency, and stability. Unstable translations make many revisions as more source content arrives, and the display flickers with each change (e.g., as a previously-displayed word is removed and replaced with a new, more accurate word). If the revision rate is very high, providing low latency is counterproductive, because the quick results may be unreliable and may not convey the appropriate meaning. On the other hand, if latency is very high, the goal of performing simultaneous translation is not met because the output lags too far behind the source audio to be useful.

The computer system 110 can use a re-translation approach augmented with inference modifications to machine translation (MT) (e.g., a neural machine translation (NMT)). Connected as discussed below, and even with off-the-shelf ASR and MT modules that are in no way fine-tuned for speech translation, the computer system 110 can provide high quality speech-to-text translation on arbitrarily long unsegmented audio. By virtue of being built on top of generic ASR and NMT models, the approach shown in FIG. 1 is easy to maintain and immediately benefits from improvements to its underlying components (e.g., the ASR and MT) with no extra overhead. The robustness of this approach is achieved across many different languages, even among languages not used in the development of the system.

The computer system 110 extends the basic idea of re-translation by obtaining a more holistic view of system performance by tracking latency, which allows for comparisons between systems that translate at different speeds. With a novel inference (e.g., search) algorithm carried out during re-translation, the computer system 110 can reduce the instability inherent in re-translation by up to 100×.

Much recent work on simultaneous translation has focused on developing streaming systems that never revise. This is typically achieved by developing specialized models to translate prefixes of sentences with an implicit or explicit agent that decides when to stop translating and instead wait for more source tokens. Unlike most of these approaches, the approach discussed herein permits output to be revised and can be used and evaluated using input speech content.

Referring still to FIG. 1, the illustrated example shows simultaneous machine translation of speech of a speaker 102. The computer system 110 can receive an audio data stream 108 including speech in a first language (e.g., Spanish) and, before the end of the sentence and while the audio data stream 108 continues to be received, the computer system 110 uses an ASR module 130 and a MT module 140 to provide a translated text 114 update including a translation of the most recent speech (e.g., the current sentence received so far) into a second language (e.g., English). As additional audio data is received, the computer system 110 provides additional translated text 114, so there is an ongoing series of translated text 114 updates concurrent with the speaking of the speaker 102. For example, the translated text can be provided as captions or sub-titles for a live audio stream, such as a lecture, video broadcast, video conference, audio call, or other source of audio.

The computer system 110 uses a processing pipeline that includes two major components, (1) simultaneous speech recognition using the ASR module 130 and (2) translation of ASR results using the MT module 140. The computer system 110 provides various processes and data structures to perform pre-processing and post-processing for the modules 130, 140, in order to connect the two in a manner that increases stability of output while also allowing low latency and high accuracy. The example of FIG. 1 shows the processing of a portion of speech and resulting translation and output of translation text, to illustrate just one instance of the transcription and translation capabilities which are used repeatedly in an ongoing manner as the system continues to process additional audio data.

To enable long-form speech translation, the computer system 110 maintains state as time progresses. The state information includes a cumulative transcription 136 and a cumulative translation 145 of the audio data stream 108 received so far. As new bytes of audio data stream in, they are sent to the ASR module 130 which emits transcribed text in real-time as and when the confidence score indicates sufficiently high confidence. The emitted transcription results are appended to the continuously growing cumulative transcription 136. On every such update, the computer system 110 takes the last, potentially incomplete sentence from the cumulative transcription 136 and sends it to the MT module 140 for translation. The result from the MT module 140 is appended to the cumulative translation 145, replacing a previous translation of the same sentence if one was present. The computer system 140 then generates and sends output text for presentation, such as the last sentence from the cumulative translation 145, potentially masking one or more tokens at the end of the sentence.

In further detail, the example shows a speaker 102 whose speech 104 is detected and recorded using a microphone of a device 106. The computer system 110 is providing simultaneous translation of the speech, in the form of text output, to another device 120 for display to a user 121. The speaker 102 is speaking in a first language, shown as "Language 1" or "L1," which is Spanish in this example. The translated text 114 is provided in a second language, shown as "Language 2" or "L2," which is English in this example.

In stage (A), the device 120 displays a user interface 122 that shows a first transcription 123, e.g., "The," for the current sentence being spoken by the user 102. The speaker 102 has spoken the phrase "el auto," which the computer system 110 has already transcribed as "El auto" and stored in a cumulative transcription document 136. The computer system 110 also already translated this phrase to English as "The car", but applied output masking 146 to omit the final token of the translation. As a result, the translation result for the sentence is "The", which is stored in a cumulative transcription document 145. The computer system 110 has already also provided to the device 120 an initial partial translation 123 for the current sentence being spoken, which is shown on a first user interface 122 of the device 120. Although the computer system 110 has received and transcribed two spoken words (e.g., "El auto") and translated that phrase in two words (e.g., "The car"), the computer system 110 used output masking 146 to delay presentation of the last word (e.g., "car"), which may potentially change as more audio data of the sentence is received.

In stage (B), the user 102 speaks additional speech 104 (e.g., the word "rojo") to continue the current sentence. The speech 104 comes in the middle of a sentence, which in turn follows earlier speech provided in the stream of speech 108. The device 106 records the speech 104 and provides audio data for the speech 104 to the computer system 110 in the audio data stream 108. In the example, the device 106 provides the audio data stream 108 to the computer system 110 over the communication network 112, which may include the Internet.

In stage (C) the computer system 110 provides the received additional audio data 109 from the audio data stream 108 to the ASR module 130 to generate transcribed text 133 (e.g., "rojo") for the most recently received speech 104. The ASR module 130 can be a standalone ASR model or ASR subsystem, configured to perform speech-to-text processing for the first language. In this case, the ASR module 130 includes one or more neural network models that are trained to transcribe Spanish speech data into Spanish text. The computer system 110 can also include a punctuation model 131, which may be integrated with the ASR module 130 or be separate, to determine where to place punctuation in the incrementally received transcribed text 133 and/or in the cumulative transcription 136 that includes the accumulated outputs from a series of ASR outputs based on different audio data from the audio data stream 108.

The ASR module 130 can provide various outputs. One is the text 133 representing the content of speech in the most recently received audio data 109. Another is a confidence score 134 indicating how confident the ASR module 130 is in the text 133, e.g., a probability score indicating how likely it is that the transcribed text 133 is the correct transcription. The ASR module 130 can provide a confidence score 134 for each instance of text 133 output. The computer system 110 can compare the confidence score 134 with a predetermined threshold, and then delay or suppress updates to the cumulative transcription 136 until a transcription with a confidence score meeting the threshold is satisfied. In other words, the computer system 110 may be configured to not use a provided transcription 133 (in the cumulative transcription 136 or as input to the MT module 140) until an appropriate level of confidence is reached.

In some implementations, the ASR module 130 provides a stability score 135 for each token (e.g., word) of the ASR output text 133. The stability score 135 indicates a probability that the corresponding token will change in a future update. The ASR module 130 may determine this score based on factors such as the confidence level, audio quality (e.g., noise level, etc.), rate that the transcribed word or similar words has been revised in the past, and so on. The computer system 110 can compare the stability score 135 to a predetermined stability score threshold, and the computer system 110 can use only tokens that assigned a score indicating a sufficient level of stability. For example, the computer system 110 can examine the ASR results and identify the first token in the sequence that does not satisfy the stability score threshold. The computer system 110 can then divide the ASR result into (i) a stable prefix, e.g., the initial portion in which all tokens satisfy the stability threshold, and (ii) an unstable suffix, e.g., the portion from the first low-stability token to the end. The computer system 110 suppresses any tokens in the unstable suffix, so they are not committed to the cumulative transcription 136 and are not passed to the MT module 140. This enhances stability but generally does not guarantee perfect stability.

In an arrangement such as FIG. 1, in which output of the ASR module 130 is provided as input to the MT module 140 for translation, the stability of ASR results directly impacts the stability of the translated output. In other words, fluctuation or flicker in the ASR results often leads to fluctuation or flicker in the MT results.

In some implementations, the computer system 110 performs post-processing operations 138 on the ASR results to improve stability of the ASR output before providing transcribed text to the MT module 140 for translation. The post-processing 138 can include one or more of (1) suppressing final punctuation, (2) suppressing tailing tokens, and (3) forcing all ASR updates to be append-only. The first two are heuristics designed to relieve pressure on the final technique, which actually produces the guarantee of stability for the cumulative transcription 136.

First, the computer system can suppress final (e.g., sentence-ending) punctuation (e.g., a period, question mark, exclamation mark, etc.) until the end of a speech utterance is detected. The punctuation predictions of an ASR model or a punctuation model are not always accurate, and may in some cases a final punctuation element may be output before the speaker 102 has actually finished the sentence. Punctuation predictions made based on language models and the recognized words, even if they have high confidence for the current set of received speech, are subject to change as additional speech is received. The effect of providing final punctuation too early can have an extremely negative effect on machine translation, especially sentence-at-a-time translation models. For example, improper punctuation can break up a sentence and cause the MT model to treat two sentence fragments as independent sentences that will then be interpreted without the proper context of the other. To avoid the errors that can come from translating text with improper final punctuation, the computer system 110 can suppress final punctuation until the end of a speech utterance is detected, since this is a more reliable indicator than predictions based on text. For example, an utterance endpoint detection model 132 can be used to examine audio data from the incoming audio data stream 108 and indicate when the end of an utterance is detected. In some implementations, the endpoint detection model 132 is a neural network model that can take into account features such as pitch, prosody, an amount of time that passes without speech, and so on to identify when a spoken statement has ended. By suppressing any sentence-final punctuation until an end-point has been found, the computer system 110 avoids committing to erroneous punctuation marks.

Second, the computer system can suppress the final k tokens from the ASR output. For example, the system can omit a predetermined number (e.g., one or more) of the last word(s) in the ASR output, until the computer system 110 can confirm that the word(s) are not changed in a subsequent ASR output. Almost all instability in the ASR output is localized to the end of the current prediction. This makes sense, because these later predictions are those that are most likely to be affected by future audio context. To avoid committing to a potentially erroneous token, the computer system 110 can suppress the final k tokens of the ASR output, regardless of the confidence scores for the tokens. Values of k between 1 and 5 often provide good trade-offs to increase stability at the cost of some latency, though the exact value may need to be tuned for a specific language or domain.

Third, the computer system 110 can require updates to the cumulative transcription 136 to be append-only updates. The computer system 110 can compare the previous transcription for the sentence with the current transcription for a sentence (which may include revisions of previously-transcribed words), align the two transcriptions, and change the minimum number of tokens needed to achieve an append-only update. For example, the system can determine an edit distance between different alignments of the two transcriptions and choose the alignment that has the smallest edit distance. Then, with the corresponding portions of the two transcriptions identified, the computer system 110 replaces the initial portion of the current transcription with the corresponding text from the previous transcription. In effect, this gives deference to any transcribed words already committed to the cumulative transcription 136, and the alignment indicates which words of the current translation represent new speech and can be added to the cumulative transcription 136. This technique is discussed in further detail with respect to FIG. 3.

Forced append-only updates allow the computer system 110 to produce ASR output that is perfectly stable, even without access to the internal data of the ASR module 130. Note, however, that too many instances of altering transcriptions to force append-only updates will degrade the final ASR quality. After all, the ASR module 130 attempted to change its earlier prediction for a reason, to provide a more accurate transcription. Therefore, the techniques of final punctuation suppression and final k token suppression are used, both of which slow down ASR only a little, but drastically reduce the number of unstable updates that the system needs to force into stability. The combination allows the computer system 110 to provide a good trade-off of ASR latency and quality.

In stage (D), the computer system 110 makes an update to the cumulative transcription 136. In this example, the computer system 110 has not omitted any tokens from the transcribed text 133, but has verified that the latest transcription results do not alter any words already in the cumulative transcription 136. The computer system 110 makes an update that appends the transcribed word "rojo" to the existing text "El auto" so that the accumulated text for the sentence includes "El auto rojo".

In stage (E), the update to the cumulative transcription 136 in stage (D) triggers a new translation iteration using the MT module 140. The computer system 110 extracts the text of the last sentence (which may be only a partial sentence) from the cumulative transcription 136 and provides the extracted text to the MT module 140. In this way, for each translation iteration performed using the MT module 140, by providing text from the cumulative transcription 136, the computer system 110 provides only text that has satisfied the confidence and stability characteristics required to commit text into the cumulative transcription 136.

The MT module 140 can use a neural machine translation (NMT) model, e.g., a neural-network-based model. In many cases, the MT module 140 uses the full context of the input phrase or sentence to be translated, but still generates predictions word-by-word. For example, for each word to be translated, a machine learning model (e.g., a trained neural network) generates a probability distribution for what the next word should be. The probability distribution can be over all the possible words in a language that might be chosen as the next translated output word. For example, the probability distribution can be a set of probability scores, each for a different word or phrase, that sum to 1, where the highest probability score indicates the word that the model indicates as the best choice for the next word in the translated sentence. The current translation iteration shown in the example can thus include a probability distribution for the word(s) to output translate "El," then another probability distribution for the next word(s) to output translate "auto," then another probability distribution for the next word(s) to output to translate "rojo." With this series of probability distributions, the biased beam search 142 can examine different paths to find the path or series of selections at each stage that results in the highest overall probability.

As mentioned above, the MT module 140 and the ASR module 130 can be independent. For example, generic, readily available, and highly reliable ASR and MT systems can be used. The MT system can be trained on large amounts of parallel sentences (e.g., pairs of sentences, in which the two sentences in the pair are in different languages but represent the same meaning). The training data can be mined from the web, and the MT module 140 can be a translation model for a general domain. The MT module 140 does not need to be fine-tuned for the speech domain or for simultaneous translation.

For each translation iteration, the input to the MT model 140 includes the full text of the last, potentially incomplete sentence in the cumulative transcription 136, not just the portion added through the update to the cumulative transcription 136. For example, even though the most recent update added only the word "rojo" to the cumulative transcription 136, the computer system 110 provides the full text of the sentence received so far, the text "El auto rojo". This causes re-translation of the earlier text "El auto" which was translated in the previous translation iteration, but this time with the added context of the word "rojo".

The computer system 110 can bias the beam search 142 to enhance the stability of output for machine translation. In general, to reduce flicker, the computer system 110 may bias a re-translation model, such as the MT module 140 and related processes, to give greater weight to its previous predictions. Occasionally, the changes that a model makes are necessary fixes that are needed to improve the quality of the translation. Other times, they are just superficial changes that do not improve quality or understanding. With biased beam search 142, the computer system 110 trades quality to improve stability, as the system is biased toward its earlier decisions that were made with less source context, with the hope to eliminate superficial changes while making meaningful changes. As a result of the beam search 142, the computer system 110 obtains the translated text 144 for the current translation iteration. In the illustrated example, the translated text 144 is "The red car".

The illustrated example shows biased beam search 142, which may be integrated with the MT module 140 or may be separate. When translating a sentence (that is potentially incomplete), the computer system 110 identifies and uses the previous translation 141 for the sentence, illustrated here as being taken from the cumulative translation document 145. To enhance stability of the translation output, the previous translation 141 used is one in which output masking 146 has already been applied. For example, the output of the MT module 140 and beam search 142 in the prior translation iteration was "The car". However, in the next iteration, the translation 141 provided to bias the next translation iteration is "The", since the output masking 146 removed the last token, "car", that was most likely to change.

In the example illustrated, the output masking 146 is applied before committing translated tokens to the stored cumulative translation 145. Optionally, a transcription can be stored in the cumulative translation 145 before performing output masking 146, and output masking 146 may be applied to sentences read out of the cumulative translation 145. In either case, the translation 141 used for biasing can be one in which output masking 146 has been applied to remove one or more of the tokens at the end, so that the beam search 142 is biased only with unmasked tokens, which prevents the system from biasing the translation toward unstable tokens.

For each word decision, the MT module 140 produces an output distribution, such as a distribution of probability scores over a set of potential words or phrases in the second language to output as a translation for an input token in the first language. The computer system 110 also determines a distribution representing the previous translation 141, e.g., a degenerate one-hot distribution having a 100% probability for the corresponding word in the prior transcription 141 and 0% probability for other words that were not chosen for that position in the prior translation 141. The beam search 142 process is modified to interpolate between (i) the posterior distribution provided by the MT module 140 and (ii) a degenerate one-hot distribution formed by the previous translation 141. The effect of the interpolation is to increase the probability score for the prior word that the system selected, while decreasing other words. As a result, beams in the beam search that include the previous transcription are given a boost for their scores, making their selection more likely. This interpolation may be performed by scaling and adding the two distributions, as discussed below.

Equation 1 below describes an example of how the biasing can be performed. In the equation, y is the output translation for the current hypothesis, and j is an index for a token in the output translation. The term x is the input sequence of terms to be translated and i is an index for tokens in the input text to be translated. The term p' is the biased probability of the next token, $y_j$, for the current hypothesis, which is conditioned on (i) the prior words selected for tokens having index of less than index j and (ii) all the input text tokens in the input sequence of terms, up to and including the most recently transcribed term at index i. The term p is the probability of the next token without biasing. The term y' represents the translation output for the previous hypothesis. The term $\beta$ is a bias value in the range from zero to 1, where the higher the value indicates higher bias toward the prior translated word. The term $\delta(y_j, y_j')$ represents the one-hot distribution for the prior translated word (e.g., if $y_j = y'_j$), so that the value is one if the predicted word in the beam matches the prior output word, and zero if it is not a match.

$$p'(y_j|y_{<j}, x_{\leq i}) = (1-\beta) \cdot p(y_j|y_{<j}, x_{\leq i}) + \beta \cdot \delta(y_j, y'_j) \quad \text{(Equation 1)}$$

The interpolation or biasing can be applied selectively to only some of the beams. For example, the computer system 110 can bias a beam only for as long as the beam has strictly followed the text of the prior translation 141. After the first point of divergence, no bias is applied, and only the posterior probability from the MT module 140 is used. In the example, the previous translation 141 is "The." In the biased beam search 142 process, when selecting the initial word for the translation of the phrase "El auto rojo," the initial word "The" has a boosted probability score because it matches the previous translation 141. If the current translation had not selected a token matching the previous transcription 141, then the biasing would be discontinued for the beam. As soon as a token selection deviates from the prior translation 141, the biasing is discontinued for the selection of any remaining tokens of the translated sentence. In this way, the system determines whether to bias each token decision based on whether the sequence of tokens preceding the current decision matches the corresponding sequence of tokens from the prior translation 141.

The computer system 110 may set a value for a stability/quality setting 143 to show how to achieve a desired tradeoff between stability and quality, and this setting 143 can determine how to weight the two distributions in the interpolation. For example, the setting 143 can be a value for the bias parameter in Equation 1 above. The higher the weight parameter for interpolation, the more the specific words of the prior translation 141 begins to dominate in the scoring and stability is more highly weighted over quality. On the other hand, a lower weight for the prior translation 141 leads to greater emphasis on the new distribution to emphasize high quality of output.

In some implementations, the stability/quality setting 143 (e.g., the value of bias parameter used) is tuned during testing and configuration of the system, and does not change while the system is used. Nevertheless, in some implementations, the computer system 110 may be configured to use different settings 143 for stability and final quality in different circumstances. For example, the computer system 110 may use different values of the setting for different combinations of ASR and MT modules, for different combinations of languages, for different sources of content or different applications, for different types or levels of complexity of speech content, for different topics or domains, and so on. Some languages or combinations of languages may require more stability bias than others. Similarly, some applications may need higher stability or higher quality, depending on the audience, the type of content, and so on. The computer system 110 can receive information indicating the characteristics of the current application and select a corresponding setting 143 from among different values of the setting 143 that have been determined for different applications or uses of the system.

In some implementations, the computer system 110 may be configured to dynamically adjust the setting 143. For example, the computer system 110 can measure the stability and latency of translation and adjust the bias setting accordingly. This adjustment and feedback may occur within the course of a single audio stream to be translated or based on multiple audio streams for which the stability and latency are measured. The computer system 110 may have a target level of stability and/or latency for the translation service it provides, and the setting 143 may be one of the parameters that it used to meet the target levels. For example, if the amount of flicker among the output exceeds a target maximum level, then the stability bias may be increased. Other parameters may be varied as well to achieve the desired performance level. For example, the number of tokens masked in the ASR post-processing 138 or the number of tokens masked in the translation output masking 146 may be varied to meet performance targets. For example, the number of terms can be decreased incrementally if stability is high. In particular, the masking may be reduced if the ASR output flicker is low, or the system determines that stability of translation is high, such as when the biasing is very infrequently changing the output that the beam search would have selected. In these cases, reducing the output masking may decrease latency with minimal decrease in stability if any. In some cases, the masking can be reduced when lower latency is needed, even if it will decrease stability.

In some implementations, the parameters such as $\beta$ and the values of k used for masking of ASR output and/or MT model output are tuned together. These parameters often interact in the way they affect the final output quality. When adjusting the bias $\beta$ alone, it can be difficult to achieve high quality, but when there is the versatility to change both $\beta$ and k, often small adjustments can yield significant improvements.

In stage (F), the computer system 110 applies output masking 146 to the translated text 144 (e.g., "The red car") to determine output text 148 ("The red") to stor in the cumulative transcription 145 and to provide to the device 120. Much of the flicker in re-translation happens toward the end of the system's output. This is because these latest translated tokens are more likely to have dependencies on source tokens (e.g., ASR results for audio that may not be received yet) that have yet to arrive. If the computer system 110 simply waits for the arrival of additional source tokens before committing to the final tokens of the translation output, the computer system 110 can reduce flicker at the cost of increased latency.

One effective way to increase stability is a simple heuristic to mask a predetermined number of the final tokens in the translated text 144. At inference time, the computer system 110 masks, e.g., omits, the last k tokens of the translated text 144 predicted for the current sentence. The masking is only applied if the current source text 133, and therefore also the translated text 144, are prefixes (e.g., incomplete or partial sentences) and thus do not represent completed sentences. To determine when to bypass the output masking 146, the computer system 110 can use the presence of sentence-ending punctuation in the translated text 144. For example, when a sentence-ending punctuation mark is identified in the translated text 144 for the current sentence, the entire translated sentence can be provided.

In the illustrated example, the translated text 144 does not have any sentence-ending punctuation, and so output masking 146 with k=1 is applied. As a result the last token from the translated text 144 "The red car" is omitted, so the output text 148 is "The red". In the prior translation iteration, the translation of the sentence was "The car", and the last token was masked so that only "The" was provided and shown in the user interface 122. In the current translated text 144, the second token is different from the second token determined in the previous translation iteration, e.g., "red" (based on the most recent speech input of "rojo") rather than the previous second token of "car". Even though the second token is different from the result of the previous translation, this will not result in flicker or instability in the user interface, because the previous second token, "car", was previously masked and so does not need to be changed.

In stage (G), the computer system 110 updates the cumulative transcription 145 so that the masked output of the most recent translation iteration is set as the translation for the current sentence. In the illustrated example, this involves replacing the prior translation for the current sentence, e.g., "The", with the new translation for the current sentence, e.g., "The red". In some implementations, the new translation may change tokens of the prior translation for the sentence. As a result, updates to the cumulative translation 145 may be able to revise or replace existing tokens in the cumulative translation 145 rather than only append new tokens. Nevertheless, due to techniques such as the masking of ASR transcribed text 133 and masking of translated text 146, it is generally rare for this type of change to be needed.

In stage (H), the computer system 110 provides the output text 148 to the device 120 over the network 112, as one update in a series of updates in the stream of translate text 114. The computer system 110 can be configured to provide the full translation for the current sentence, not necessarily just text to append to the prior transcription. For example, rather than provide only the new token, "red," the computer system 110 can provide the full output text 148, "The red," representing the sentence as a whole after the output masking 146 is applied. This way, the client device 120 replace the prior text if a revision other than appending a new token needs to be made. The client device 120 can be configured to compare the received sentence and update the display appropriately. In other implementations, the computer system 110 may not repeat tokens that do not change, and may send tokens with instructions, such as to "append 'red'" to the prior translation text. For changes other than appending new tokens, the instruction can specify the token to be changed, or an insertion to be made, and so on.

In stage (I), the device 120 provides the user interface 126, which includes an update to the display based on the output text 148 received in the translated text stream 114. The user interface 126 shows displayed text 127 of "The red" and as noted above, does not show flicker or revision to prior words even though the most recent re-translation of the sentence changed the second token of the translated sentence from "car" to "red". The update to the displayed text 127 is performed substantially in real time, for example, while the speaker 102 continues to speak and even continue the current sentence.

The operations of FIG. 1 can be repeated in an ongoing manner as long as additional audio data is received in the audio data stream 108. Once a full sentence is translated, e.g., once the utterance endpoint detection model 132 identifies the end of a sentence and/or there is high confidence in the placement of a sentence-ending punctuation mark, the machine translation module 140 can also signal the end of a sentence in the translated text 144. The computer system 110 uses this indication of the end of a sentence to reset the re-translation process. For example, from that point onward, the prior sentence that was indicated to be complete is no longer re-translated and the computer system 110 begins a new sentence with the next token.

Although the example of FIG. 1 shows text output on the user interfaces of the device 120, there are instances where the text output may be converted to speech and presented audibly to a user. For example, the incremental additions to a translated sentence can be provided to a speech synthesizer (e.g., a text-to-speech system) to generate audio data to be output by a user's device.

Audio output is one example in which stability is particularly important, because the system cannot take back erroneous words once they have been output audibly. As a result, some systems will wait for an entire sentence to be spoken and the translation for the sentence completed before outputting a translation. This can lead to very high latency, since the user listening for a translation would not hear the beginning of the translation for the sentence until after the speaker has finished the sentence. The approaches discussed herein can be used to improve stability and even guarantee that no flicker will occur (e.g., by setting β to 1). With these techniques, rather than waiting for a speaker's sentence to be finished, the system can begin to provide a translation, with synthesized speech after only the first word or two of a sentence have been spoken, and additional translated words can be provided in an incremental, ongoing manner, rather than waiting and providing an entire sentence at a time with large pauses between sentences.

Although the example of FIG. 1 shows transcription and translation being performed at a server system, other arrangements are possible. For example, the computer system 110 may interact with other computer systems that provide ASR and MT services. For example, the computer system 110 may send requests using application programming interfaces (APIs) to ASR systems and MT systems rather than running and storing the models itself. As another example, some or all of the processing may be done by a user device or client device. For example, the processing shown as being performed by the computer system 110 may be performed on a phone, laptop computer, tablet computer, or other device. A user's device may store and use an ASR model, a MT model, or both to be able to provide the transcription and translation services. Alternatively, the user device may rely on external ASR and MT services accessed over a network, so the user device sends a request for ASR results, processes the results received, sends a request for MT results, and then receives and outputs the results. If audible output is needed, a user device may use an on-device speech synthesis model, or may again send a request for speech synthesis results from a remote server.

Stable, low-latency translation can be used in many different applications. For example, the system can be used to translate a phone call, video conference, or other online communication session. This can be done as shown in FIG. 1, where the stream is processed by a service and translation results are delivered through the platform for the streaming service. Other options are possible, such as the device 120 receiving a stream of audio (e.g., from the device 106 over the network, by capturing local ambient audio, etc.) and passing the audio to a server and receiving the real-time translations in response. This can be a useful translation tool for a traveler, for example, when conversing with someone in another language, the user's device can capture the audio in the conversation with a microphone and, using translation managed by the device or by a server such as the computer system 110, provide a stream of translated text for display. If the user's device manages the translation, connecting an appropriate ASR mode and MT model, then the device may use locally-stored models, server-operated models, or some combination of both. Functionality to allow real-time translations for spoken audio may be integrated into products than phones, for example, into headphones, earphones, a single earpiece or earbud, and other devices. For example, earphones or an earbud may have a microphone to capture audio, and may include the capability to stream the audio to a server over a network (potentially through a phone or other connected device) and receive and present synthesized speech of the translation as output in an ongoing manner.

FIG. 2 is a diagram showing an example of data from a series of translation updates from the computer system 110. The figure shows a table 200 showing rows that each represent different iterations of translation or re-translating a particular sentence as additional speech context of the sentence is received. Column 220 gives a number or identifier for each update. Column 204 provides the new text added by the ASR system 130 to the cumulative transcription 136. Column 206 provides the segment of text that is provided to the MT module 140 to be translated. Column 208 provides the translation result (e.g., translated text 144) that is determined. Column 210 shows the caption or output text 148 that is provided, as a result of applying output masking to the most recent translation.

In the example, the table 200 shows that even though the ASR module 130 may provide incremental transcribed text one token at a time (column 204), the computer system 110 provides the entire sentence received so far (column 206) to the MT module 140, which results in retranslating the initial portions of the sentence multiple times. In the example, this results in a change to the initial portion of the translation result (column 208) at update 236, where the translation changes from "Never is" to "It is never too late". Even with the techniques to maintain stability of the ASR results, there may be occasions when the earlier tokens of the translation need to change, and the retranslation approach allows this when it will improve the quality of the translation. Fortunately, because the output masking removes the last token the translation results (column 208) to generate the caption (column 210), the amount of change shown to the user is minimal. There is a revision to the provided text once, corresponding to output 236, but no other revisions are needed. This includes at update 238, in which the previous last token "for" is removed and replaced with "to". Also, update 238 shows how once the sentence-ending punctuation mark is included in the translation result, the output masking is bypassed and the full translation result is provided as the output caption.

To measure and improve the system for long-form spoken language retranslation, an evaluation framework can be used to measure performance. For example, the quality, latency, and stability of the system's translated output can be measured. In general, evaluation can be done at the document level wherever possible. To better track performance, the computer system 110 can generate an event log. This can be an ordered list of events, where the $i^{th}$ event is a record that includes (1) $s_i$ the source text recognized so far, (2) $o_i$ the translated output text currently displayed, and (3) $t_i$ a timestamp. Events are logged every time the source text (e.g., ASR result) or output (e.g., translation output) changes. Each event i records the entire session, or spoken document, up to time $t_i$, allowing us to work and evaluate without providing our system gold-standard segmentations. Note that each event can arbitrarily alter the previously displayed text. Text is tokenized into token vectors $s_i=[s_{i,1} \ldots s_{i,j} \ldots s_{i,|s_i|}]$ and $o_i=[o_{i,1} \ldots o_{i,j} \ldots o_{i,|o_i|}]$ where the $|\cdot|$ operator measures the length of a vector. We use l to represent the total number of events, so $o_l$ represents the final output of the system for the sentence. An example event log is shown in Table 1 below.

TABLE 1

| Time | Source | Output |
| --- | --- | --- |
| 2.0 | Neue Arzneimittel könnten | New Medicines |
| 3.5 | Neue Arzneimittel könnten Eierstockkrebs | New Medicines may be ovarian cancer |
| 4.2 | Neue Arzneimittel könnten Eierstockkrebs verlangsamen | New Medicines may slow ovarian cancer |

To measure quality, the system can assess the quality of the translation of the final output vector $o_l$. The system can assign a case-sensitive BLEU (Bilingual Evaluation Understudy) score, after aligning the unsegmented translation output with the provided reference sentences by minimizing word error rate (WER). The system can be configured to not explicitly measure the translation quality of intermediate events. Instead, this is implicitly captured by metrics for latency and stability, which indicate whether intermediate events differed significantly from the final output.

To measure latency relative to the speaker, the system can compute a time delay between when a source word was spoken versus when a corresponding output word was finalized. A word is finalized in the first event where the word and any words before it remain unchanged for all subsequent events. Formally, the finalization event index for the $j^{th}$ word ($1 \leq j \leq |o_l|$) in the final output vector $o_l$ is given by Equation 2:

$$f(j) = \min_i \text{ s.t. } o_{i',j'} = o_{l,j'} \forall i' \geq i \quad \text{(Equation 2)}$$

and $$\forall j' \leq j$$

and the finalization time is $t_{f(j)}$.

A correspondence is imposed between source and output words based on their relative positions in a heuristically-derived parallel sentence pair. The sentence pair can be a set of two equivalent sentences, one in the source language and a corresponding equivalent sentence in the target language. The same WER alignment for quality analysis can be used to align of to the segments of a reference translation, which in turn have a segment alignment to the reference source transcription. Let u be the vector of absolute positions in the output segment containing j, and v be the vector of positions in its parallel reference source segment. The reference source position j* for the $j^{th}$ output token is defined as $j^*=(j-u_0)\cdot|v|/|u|+v_0$. This provides parameter-free temporal correspondence. The latency for the jth output token is then given in Equation 3:

$$TL(j)=t_{f(j)}-\text{time}(j^*) \quad \text{(Equation 3)}$$

where time(·) gives the utterance time for a reference source token. The measure can average across all output tokens to get the Translation Lag (TL) for the Event Log as shown in Equation 4:

$$TL = \frac{1}{|o_I|} \sum_{j=1}^{|o_I|} TL(j) \quad \text{(Equation 4)}$$

This measures in seconds how target content (e.g., output translation text) lags behind spoken source content.

To measure stability, a live translation system that is allowed to make revisions could exploit this to frequently make risky guesses that would lower lag on the off-chance that they were correct. These frequent revisions would produce a visible flickering effect that can be irritating and distracting to users. Flicker can be measured directly with an erasure score E, which measures the number of tokens that must be deleted from the suffix of the previous translation to produce the next. For the $i^{th}$ event, the erasure of the output is defined as shown in Equation 5):

$$E(i) = |o_{i-1}| - |LCP(o_i, o_{i-1})| \quad \text{(Equation 5)}$$

where LCP calculates the longest common prefix of two sequences. For example, in Table 1 above, output at time 4.2 replaces "be" with "slow," resulting in an erasure score of 3 for the deletion of the suffix "be ovarian cancer." The normalized erasure score of an event log is defined as the aggregate erasure divided by the output length in the final event, as indicated in Equation 6:

$$NE = \frac{1}{|o_I|} \sum_{i}^{I} E(i) \quad \text{(Equation 6)}$$

Evaluation of example systems using the heuristics discussed above shows significant improvement. One text involved an English-to-German simultaneous spoken language translation scenario. Test set results, measured in BLEU, Translation Lag (TL) and Normalized Erasure (NE), are shown in Table 2. TL is Translation Lag, measured in seconds. NE is Normalized Erasure, measured in the number of erased partial target tokens per final target token.

TABLE 2

| System | β | k | BLEU | TL | NE |
|---|---|---|---|---|---|
| Baseline | 0.0 | 0 | 20.40 | 4.13 | 2.11 |
| +Bias | 0.5 | 0 | 20.03 | 3.00 | 0.72 |
| +Mask-k | 0.0 | 10 | 20.40 | 5.98 | 0.53 |
| +Both | 0.5 | 5 | 20.17 | 4.11 | 0.12 |

The baseline example in Table 2 is a basic re-translation system with standard beam search. Its TL indicates that its stable predictions lag 4.13 seconds behind the spoken source, while its NE shows that 2.11 tokens are incrementally erased and replaced for every token in the final translation—the translation is constantly in flux.

The next line in Table 2 shows results for biased beam search alone (+Bias), then masking alone (+Mask-k), and then both. The hyper-parameters, β∈{0.1, 0.2, 0.3, 0.50.8, 1.0} and k∈{0, 1, 2, 3, 4, 5, 7, 10}, are tuned on the development set for each configuration.

In the presence of multiple objectives, one metric can be optimized while placing constraints on the others. For +Bias, β can be varied to minimize NE while staying within 1 BLEU of Baseline. Since words are finalized sooner with bias, TL also decreases. For +Mask-k results are shown for a configuration that lags the baseline by 2 seconds but lowers NE. As expected, BLEU is not affected by masking alone. Finally, in +Both, we vary both β and k to maximize BLEU, while keeping TL less than that of the baseline, and NE less than the best NE for either heuristic alone. Using both strategies allows us to reach an excellent compromise: comparable BLEU and TL to the baseline, while producing a 20× reduction in NE.

Effectiveness is also found with respect to other languages. Without any further fine-tuning, the same hyper-parameters from the English-to-German experiments (?=0.5 and k=5) are used to reduce erasure and lag. The approach is remarkably robust, never reducing BLEU by more than 1 point, consistently improving lag, and always reducing erasure to negligible amounts.

The results show that the techniques discussed herein are very effective for reducing flicker and reducing lag. The inference algorithms can be used to stitch together off-the-shelf ASR and MT models to obtain high quality simultaneous translation. Without development of specialized models from scratch, the approach can still provide support for simultaneous translation to any language for which a translation system is available.

FIG. 3 is a diagram showing an example of techniques to process speech recognition results to ensure stability of results used for translation. As discussed above, one of the ways to improve stability in the post-processing 138 of ASR results is to force updates to the cumulative transcription 136 to be append-only. To deal with cases where the next transcription from the ASR module 130 does in fact change a word already committed to the cumulative transcription 136, the computer system 110 needs to determine which part of the current ASR output to discard and which portion to add to the cumulative transcription 136.

The computer system 110 creates an append-only guarantee for the cumulative transcription through a Levenshtein alignment. Let transcription $T_{prev}$ be the output of ASR that was committed to most recently by sending it for translation, and let transcription $T_{next}$ be the output from ASR, from which we would like to derive a stable extension to prev. Both $T_{prev}$ and $T_{next}$ have undergone stability thresholding, final punctuation suppression, and final k token suppression. For the vast majority of cases, $T_{prev}$ will be a prefix of transcription $T_{next}$, and transcription $T_{next}$ can be used as is. However, if $T_{prev}$ is not a prefix of transcription $T_{next}$, the computer system 110 can enforce this property by finding the shortest prefix of transcription $T_{next}$ that minimizes the Levenshtein distance with respect to $T_{prev}$. The computer system 110 can calculate the Levenshtein distance over UTF8 characters (for language independence), with insert, deletion and substitution costs of 1, and a matching cost of 0.

The computer system 110 then replaces that prefix with transcription $T_{prev}$, creating a transcription $T_{next}$ which has $T_{prev}$ as a prefix by definition. By replacing the Shortest Prefix that Minimizes the Levenshtein Distance (abbreviated as "SPMLD"), the system can minimize the Levenshtein distance between transcription $T_{next}$ and transcription $T_{next}'$. In other words, the computer system 110 can make the least disruptive change to transcription $T_{next}$ that maintains the desired append-only property. An example is shown below:

Previous Transcription $T_{prev}$: requieran
Next Transcription $T_{next}$: Requirieran un transplante
SPMLD: Requirieran
Revised Next Transcription $T_{next}'$: requieran un transplante A naive implementation of the search for the SPMLD would calculate the Levenshtein distance with respect to $T_{prev}$ for each possible prefix of transcription $T_{next}$, to find the shortest prefix with minimal distance. Since calculating Levenshtein distance is a quadratic-cost dynamic program, the overall computational complexity of this solution would be cubic in the length of transcription $T_{next}$. However, it is possible to perform the same operation with a single Levenshtein distance calculation, by taking advantage of the matrix used to calculate the Levenshtein distance, specifically, the property that the Levenshtein distance matrix calculates the minimum Levenshtein distance between each possible prefix pair of its two input strings. Knowing this, the computer system 110 can calculate the Levenshtein matrix once for $T_{prev}$ and transcription $T_{next}$ (quadratic cost), and from that, read the Levenshtein distance between $T_{prev}$ for each possible prefix of transcription $T_{next}$ (linear cost), for a total quadratic cost.

An algorithm to find the SPMLD for $T_{prev}$ and $T_{next}$ is shown below:

Calculate the Levenshtein Distance Matrix for $T_{prev}$ and $T_{next}$ (quadratic)
Let L be this matrix, where L(i,j) gives the minimum Levenshtein distance between the i'th character of $T_{prev}$ and the j'th character of next. L(len($T_{prev}$), len($T_{next}$)) gives the Levenshtein distance between $T_{prev}$ and $T_{next}$.
Find the shortest, minimum distance length prefix of $T_{next}$ (linear):
  min_distance=infinity
  min_index=-1
  for j=1 to len(Tnext), do:
    if L(len(Tprev), j)<min_distance:
      min_distance=L(len(Tprev), j)
      min_index=j
  return min_index FIG. 3 shows an example of running a search for the SPMLD using a matrix 300, e.g., the "L" matrix discussed in the algorithm above. The example shows the matrix 300 for $T_{prev}$="requieran" and $T_{next}$="Requirieran un transplante". The row 310 represents $T_{next}$, the next transcription being considered, while the column 312 represents the transcription $T_{prev}$. The other values in the matrix represent Levenshtein scores for at different positions through $T_{next}$ and $T_{prev}$.

The computer system 110 searches along the bottom row 320, which is the row representing the end (e.g., last character) of the transcription $T_{prev}$. In this search, the computer system 110 finds the entry 322 having the lowest edit distance in the row, e.g., a score of 3. This designates the prefix 324 of the current hypothesis, shown in black with white text. As a result, the prefix "Requirieran" is omitted, and only the suffix portion, e.g., "un transplante," will be appended to the cumulative transcription.

Forced append-only updates allow us to produce ASR output that is perfectly stable, even without access to the internals of the ASR system. Note that too many forced append-only updates will degrade the final ASR quality; after all, the ASR system attempted to change its earlier prediction for a reason. Therefore, we are careful to also apply final punctuation suppression and final k token suppression, both of which slow down ASR only a little, but drastically reduce the number of unstable updates that we need to force into stability. The combination allows us to arrive at a good trade-off of ASR latency and quality.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
   receiving, by the one or more computers, a stream of audio data comprising speech in a first language;
   generating, by the one or more computers, a transcription for the speech in the stream of audio data using an automated speech recognizer, the transcription being incrementally generated by the automated speech recognizer through a series of updates that add additional text in the first language to the transcription;
   generating, by the one or more computers, a translation of the transcription into a second language using a machine translation module, the translation being generated by performing, in response to each of the updates that add additional text in the first language to the transcription, a corresponding translation iteration that translates into the second language an end portion of the transcription, wherein the end portion for at least some of the translation iterations comprises (i) the additional text corresponding to the update and (ii) previously-translated text of the transcription, wherein the one or more computers promote stability of the translation across the translation iterations by biasing generation of translation output such that, for each of at least some of the translation iterations, a text segment that was translated in a previous translation iteration is re-translated with a bias toward generating translation output that includes a same translation result generated for the text segment in the previous translation iteration, wherein biasing generation of the translation output comprises biasing a beam search process such that, for a second or subsequent translation iteration for a sentence, the biasing increases a likelihood of selection of a beam that includes the results of the immediately previous translation iteration for the sentence, wherein biasing the beam search process comprises:
   providing (i) a sequence of one or more source tokens to be translated, and (ii) a sequence of one or more output tokens from the previous translation iteration; and
   determining a score for an output token in the beam search by interpolating between (i) a posterior distribution provided by the machine translation module and (ii) a distribution representing the sequence of one or more output tokens from the previous translation iteration; and providing, by the one or more computers and over a communication network, a series of translation updates to a client device based on the translation iterations, wherein the translation updates respectively provide portions of the translated text from the corresponding translation iterations.

2. The method of claim 1, wherein generating the transcription, generating the translation, and providing the translation updates are performed concurrently with receiving additional audio data in the stream of audio data.

3. The method of claim 1, wherein each of the end portions includes a last full sentence of the transcription or a last partial sentence in the transcription.

4. The method of claim 1, wherein performing the translation iterations comprises:
  performing a first translation iteration that translates a first word in a sentence; and
  performing successive translation iterations, as additional words in the sentence are received from the automated speech recognizer, that each retranslate the first word in the sentence along with subsequently received text of the sentence, such that the text translated in the successive iterations is expanded at each successive iteration until a translation iteration for the full sentence is performed.

5. The method of claim 1, wherein providing the series of translation updates comprises omitting, from each of the translation updates that do not correspond to the translation of a full sentence, a predetermined number of tokens at the end of the sentence.

6. The method of claim 1, wherein biasing the translation comprises biasing toward a beam that has strictly followed a target sequence representing a previous translation for sentence currently being translated; and
  in response to detecting that a beam diverges from the target sequence, removing the bias for the beam.

7. The method of claim 1, wherein the machine translation module comprises a neural machine translation model.

8. The method of claim 1, comprising applying one or more post-processing operations to the output of the automated speech recognizer to increase stability of transcription results before providing transcribed text to the machine translation module.

9. The method of claim 8, wherein the one or more post-processing operations comprise:
  evaluating, for individual tokens of transcribed text, a stability score indicative of a probability that the token will change in a future update by the automated speech recognizer; and
  suppressing tokens for which the stability score does not satisfy a predetermined threshold from being provided to the machine translation module for translation.

10. The method of claim 8, wherein the one or more post-processing operations comprise omitting, from the text provided to the machine translation module, punctuation that denotes the end of a sentence until a predetermined condition is determined.

11. The method of claim 10, wherein the predetermined condition comprises detection of a speech utterance endpoint.

12. The method of claim 8, wherein the one or more post-processing operations comprise omitting, from the text provided to the machine translation module, a predetermined number of tokens from the end of the automated speech recognizer output.

13. The method of claim 8, wherein the one or more post-processing operations comprise limiting updates to the transcription for the stream of audio data to appending additional words without revising existing words in the transcription.

14. The method of claim 13, comprising, in response to determining that a transcription for a portion of the audio data differs from a prior transcription for the portion audio data:
  identifying a shortest prefix portion of a current transcription of a sentence that can be replaced with the prior transcription to minimize an edit distance between the current transcription and the prior transcription of the sentence;
  generating an altered version of the current transcription that replaces the identified shortest prefix portion with the prior transcription of the sentence; and
  providing the generated altered version of the current transcription to the machine translation module for translation into the second language.

15. The method of claim 14, wherein the edit distance is a Levenshtein distance over characters.

16. A system comprising:
one or more computers; and
one or more computer-readable media storing instructions that, when executed by the one or more computers, are operable to cause the one or more computers to perform operations comprising:
  receiving, by the one or more computers, a stream of audio data comprising speech in a first language;
  generating, by the one or more computers, a transcription for the speech in the stream of audio data using an automated speech recognizer, the transcription being incrementally generated by the automated speech recognizer through a series of updates that add additional text in the first language to the transcription;
  generating, by the one or more computers, a translation of the transcription into a second language using a machine translation module, the translation being generated by performing, in response to each of the updates that add additional text in the first language to the transcription, a corresponding translation iteration that translates into the second language an end portion of the transcription, wherein the end portion for at least some of the translation iterations comprises (i) the additional text corresponding to the update and (ii) previously-translated text of the transcription, wherein the one or more computers promote stability of the translation across the translation iterations by biasing generation of translation output such that, for each of at least some of the translation iterations, a text segment that was translated in a previous translation iteration is re-translated with a bias toward generating translation output that includes a same translation result generated for the text segment in the previous translation iteration, wherein biasing generation of the translation output comprises biasing a beam search process such that, for a second or subsequent translation iteration for a sentence, the biasing increases a likelihood of selection of a beam that includes the results of the immediately previous translation iteration for the sentence, wherein biasing the beam search process comprises:
    providing (i) a sequence of one or more source tokens to be translated, and (ii) a sequence of one or more output tokens from the previous translation iteration; and determining a score for an output token in the beam search by interpolating between (i) a posterior distribution provided by the machine translation module and (ii) a distribution representing the sequence of one or more output tokens from the previous translation iteration; and providing, by the one or more computers and over a communication network, a series of translation updates to a client device based on the translation iterations, wherein the translation updates respectively provide portions of the translated text from the corresponding translation iterations.

17. One or more non-transitory computer-readable media storing instructions that, when executed by one or more computers, are operable to cause the one or more computers to perform operations comprising:

receiving, by the one or more computers, a stream of audio data comprising speech in a first language;

generating, by the one or more computers, a transcription for the speech in the stream of audio data using an automated speech recognizer, the transcription being incrementally generated by the automated speech recognizer through a series of updates that add additional text in the first language to the transcription;

generating, by the one or more computers, a translation of the transcription into a second language using a machine translation module, the translation being generated by performing, in response to each of the updates that add additional text in the first language to the transcription, a corresponding translation iteration that translates into the second language an end portion of the transcription, wherein the end portion for at least some of the translation iterations comprises (i) the additional text corresponding to the update and (ii) previously-translated text of the transcription, wherein the one or more computers promote stability of the translation across the translation iterations by biasing generation of translation output such that, for each of at least some of the translation iterations, a text segment that was translated in a previous translation iteration is re-translated with a bias toward generating translation output that includes a same translation result generated for the text segment in the previous translation iteration, wherein biasing generation of the translation output comprises biasing a beam search process such that, for a second or subsequent translation iteration for a sentence, the biasing increases a likelihood of selection of a beam that includes the results of the immediately previous translation iteration for the sentence, wherein biasing the beam search process comprises:

providing (i) a sequence of one or more source tokens to be translated, and (ii) a sequence of one or more output tokens from the previous translation iteration; and determining a score for an output token in the beam search by interpolating between (i) a posterior distribution provided by the machine translation module and (ii) a distribution representing the sequence of one or more output tokens from the previous translation iteration; and providing, by the one or more computers and over a communication network, a series of translation updates to a client device based on the translation iterations, wherein the translation updates respectively provide portions of the translated text from the corresponding translation iterations.

18. The method of claim 1, wherein, for each of at least some of the translation updates, the translated text provided in the translation update omits one or more tokens from an end of the translation result generated for the translation iteration corresponding to the translation update.

* * * * *